US010403248B2

(12) United States Patent
Hashimoto

(10) Patent No.: US 10,403,248 B2
(45) Date of Patent: Sep. 3, 2019

(54) DRUM HEAD

(71) Applicant: YAMAHA CORPORATION, Hamamatsu-shi (JP)

(72) Inventor: Ryuji Hashimoto, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/045,056

(22) Filed: Jul. 25, 2018

(65) Prior Publication Data

US 2018/0350331 A1 Dec. 6, 2018

Related U.S. Application Data

(63) Continuation of application No. PCT/JP2016/083200, filed on Nov. 9, 2016.

(30) Foreign Application Priority Data

Feb. 1, 2016 (JP) ................................ 2016-016852

(51) Int. Cl.
*G10D 13/02* (2006.01)
*G10H 3/14* (2006.01)

(52) U.S. Cl.
CPC ......... *G10D 13/027* (2013.01); *G10D 13/024* (2013.01); *G10H 3/14* (2013.01);
(Continued)

(58) Field of Classification Search
CPC ...... G10D 13/027; G10D 13/00; G10D 13/02; G10H 3/14
(Continued)

(56) References Cited

U.S. PATENT DOCUMENTS 5,042,356 A 8/1991 Karch
8,354,581 B2 * 1/2013 Eventoff ............. G10D 13/024 84/104

(Continued)

FOREIGN PATENT DOCUMENTS

JP S5399496 A 8/1978
JP S5587592 U 6/1980

(Continued)

OTHER PUBLICATIONS

International Search Report issued in Intl. Appln. No. PCT/JP2016/083200 dated Dec. 20, 2016. English translation provided.

(Continued)

*Primary Examiner* — Jianchun Qin
(74) *Attorney, Agent, or Firm* — Rossi, Kimms & McDowell LLP

(57) ABSTRACT

A drum head includes: a first film including a striking surface; a second film disposed opposed to a back surface of the first film which is back from the striking surface; and a sensor disposed between the first film and the second film and configured to output a signal related to vibration. The sensor includes: a first contact surface configured to contact the back surface of the first film without being secured to the back surface; and a second contact surface configured to contact a front surface of the second film without being secured to the front surface. A sensor tail of the sensor is secured to at least one of the first film and the second film located outside the shell when the first film and the second film are stretched over an open end of a shell.

4 Claims, 3 Drawing Sheets

(52) U.S. Cl.
CPC ....... *G10H 3/146* (2013.01); *G10H 2220/535* (2013.01); *G10H 2230/275* (2013.01)

(58) Field of Classification Search
USPC ............................................................ 84/414
See application file for complete search history.

(56) References Cited

U.S. PATENT DOCUMENTS

| | | | |
|---|---|---|---|
| 9,672,802 B2 * | 6/2017 | Muzzio | G10H 3/146 |
| 2004/0134332 A1 | 7/2004 | Kamijima et al. | |
| 2014/0060211 A1 | 3/2014 | Van Den Broeck | |

FOREIGN PATENT DOCUMENTS

| | | |
|---|---|---|
| JP | S5599586 U | 7/1980 |
| JP | 3434509 B2 | 8/2003 |
| JP | 2014524008 A | 9/2014 |

OTHER PUBLICATIONS

Written Opinion issued in Intl. Appln. No. PCT/JP2016/083200 dated Dec. 20, 2016. English translation provided.
International Preliminary Report on Patentability issued in Intl. Appln. No. PCT/JP2016/083200 dated Aug. 16, 2018. English translation provided.
Office Action issued in Japanese Appln. No. 2016-016852 dated Apr. 9, 2019. English translation provided.

* cited by examiner

DRUM HEAD

TECHNICAL FIELD

The present invention relates to a drum head.

BACKGROUND ART

Patent Document 1 discloses a drum including a multi-layer drum head including a first layer and a second layer. In the drum head disclosed in Patent Document 1, a force sensing register is disposed between the first layer and the second layer. The force sensing register is disposed on the entire drum head (more specifically, the entire strikable playing zone). A bias voltage is applied to the force sensing register. When the first layer is struck, a resistance value of a portion of the force sensing register which is located under a struck portion of the first layer changes at the instance of the strike. The drum head disclosed in Patent Document 1 outputs a pulse signal related to the change in the resistance value of the force sensing register. Thus, the force sensing register of the drum head disclosed in Patent Document 1 detects the timing of the strike.

PRIOR ART DOCUMENTS

Patent Documents

Patent Document 1: Specification of U.S. Pat. No. 8,354,581
Patent Document 2: Japanese Patent No. 3434509

SUMMARY OF THE INVENTION

Object to be Achieved by the Invention

The pulse signal output from the drum head disclosed in Patent Document 1 is used as a signal representing a drum waveform of sound recorded in advance or as a control signal for outputting a MIDI (Musical Instrument Digital Interface) signal, for example. That is, the pulse signal output from the drum head disclosed in Patent Document 1 is not a signal representing a waveform of vibration of the drum head. Thus, even if the pulse signal output from the drum head disclosed in Patent Document 1 is converted to sound, it is impossible to obtain native sound to be produced by the drum.

The present invention has been developed in view of the above-described situations, and it is an object of the present invention to provide a technique capable of outputting a signal representing native sound to be produced by a drum.

Means for Achieving Object

The present invention provides a drum head including: a first film comprising a striking surface; a second film disposed opposed to a back surface of the first film which is back from the striking surface; and a sensor disposed between the first film and the second film and configured to output a signal related to vibration, wherein the sensor comprises: a first contact surface configured to contact the back surface of the first film without being secured to the back surface; and a second contact surface configured to contact a front surface of the second film without being secured to the front surface.

In the drum head according to the present invention, the sensor configured to output a signal related to vibration of the drum head is disposed between the first film and the second film without being secured to the first film and the second film. Thus, the sensor of the present drum head detects vibration of the drum head stretched over a drum, without interfering the vibration. Since the vibration of the drum head is not interfered, the vibration of the drum head which is detected by the sensor is vibration which produces native sound to be produced by the drum. Thus, the present drum head can output the signal representing the native sound to be produced by the drum. Accordingly, it is possible to obtain the native sound to be produced by the drum, by converting, to sound, the signal output from the present drum head.

Patent Document 2 discloses a drum including: a drum head having a thin metal plate pressed against a back surface of a striking surface; and a pickup microphone disposed spaced apart from the metal plate at a predetermined distance therebetween. In the drum disclosed in Patent Document 2, when the striking surface is struck, the metal plate is vibrated, and the pickup microphone detects the vibration of the metal plate and outputs it electrically. Thus, in the drum disclosed in Patent Document 2, the pickup microphone for detecting vibration of the drum head is provided independently of the drum head. In contrast, the present drum head includes the sensor configured to detect vibration and disposed between the first film and the second film. Thus, the present drum head is different from the drum head disclosed in Patent Document 2. In the drum disclosed in Patent Document 2, since the metal plate is pressed against the drum head, a state of vibration of the drum head may change when compared with a common drum head in which a metal plate is not pressed against a drum head. This may lead to a difference between a tone color of sound to which a signal output from the pickup microphone is converted in the drum disclosed in Patent Document 2 and a tone color of sound produced by the common drum. In the present drum head, in contrast, the sensor is disposed between the first film and the second film without being secured to the first film and the second film, making it possible for the sensor to detect vibration of the drum head without change in a state of the vibration of the drum head. This configuration enables the present drum head to obtain an output signal representing sound having a tone color similar to that of sound produced by the common drum.

EMBODIMENTS

Hereinafter, there will be described embodiments by reference to the drawings.

Embodiments

Figure 1:
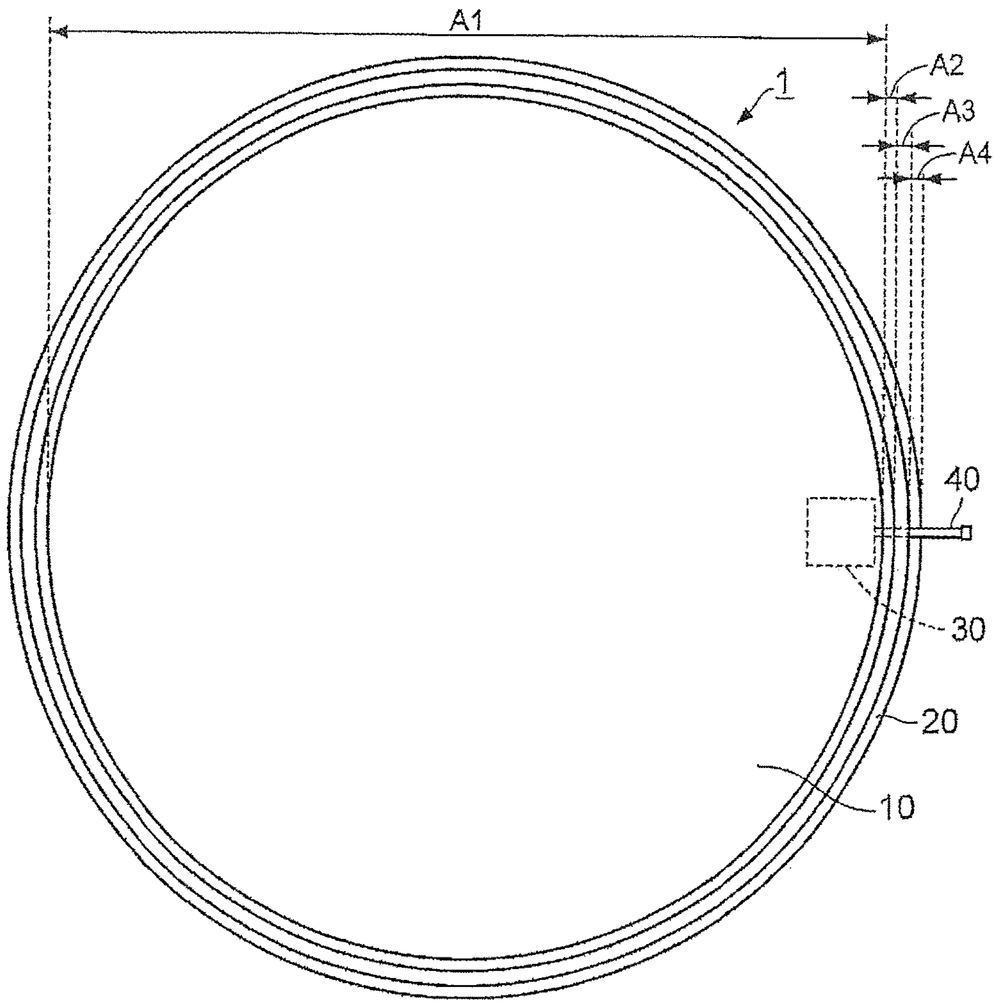
FIG. 1 is a plan view of a drum head 1 according to a first embodiment of the present invention.
Figure 2:
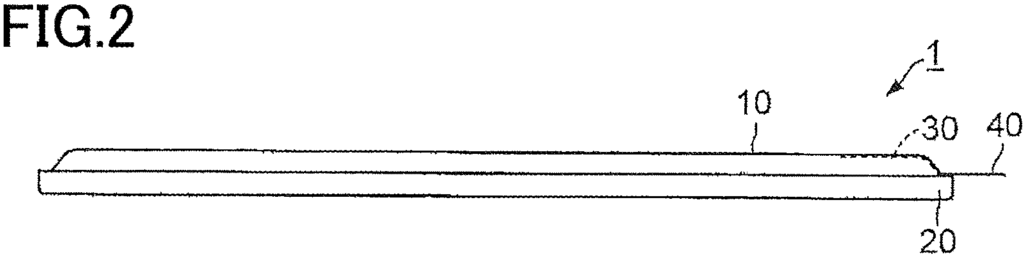
FIG. 2 is a side view illustrating a configuration of the drum head 1.

FIG. 1 is a plan view illustrating a configuration of a drum head 1 according to a first embodiment of the present invention. FIG. 2 is a side view illustrating the configuration of the drum head 1. The drum head 1 is stretched over an open end of a shell of a drum such as a tom, a snare drum, and a bass drum, for example.

The drum head 1 includes a head portion 10, a flesh hoop 20, a sensor 30, and a sensor tail 40. The flesh hoop 20 is shaped like a ring having an inside diameter greater than an outside diameter of the shell. The head portion 10 is disposed inside the ring of the flesh hoop 20. The head portion 10 is shaped like a round film. An outer edge of the head portion 10 is connected to the flesh hoop 20, and the head portion 10 is held by the flesh hoop 20. The sensor 30 is provided near the outer edge of the head portion 10. The sensor tail 40 is connected to the sensor 30. The sensor tail 40 is a lead line for outputting a signal output from the sensor 30, to an external device.

Figure 3:
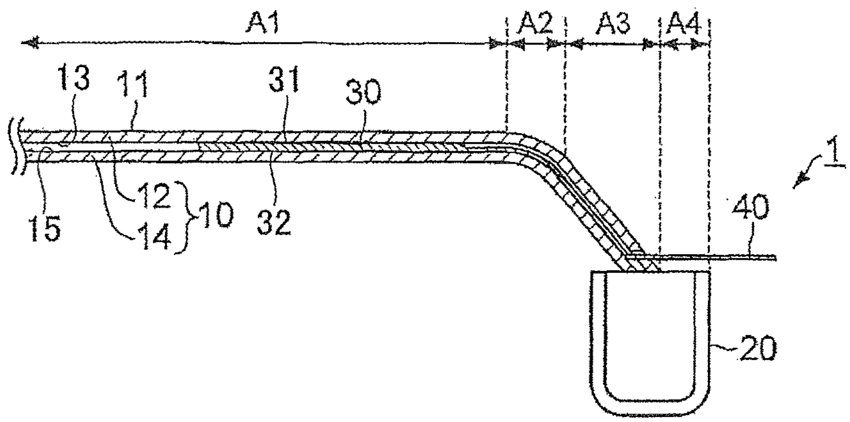
FIG. 3 is a cross-sectional view illustrating a portion of a cross section of the drum head 1.

FIG. 3 is a cross-sectional view illustrating a cross section of a portion of the drum head 1 at which the sensor 30 is provided. The head portion 10 is constituted by a first film 12 and a second film 14. Each of the first film 12 and the second film 14 is a round film having a thickness of about 175 μm, for example. Each of the first film 12 and the second film 14 is formed of a material such as polyethylene terephthalate (PET). The first film 12 has a striking surface 11 which is struck by a user (a player). An upper surface 15 (as one example of a front surface) of the second film 14 is disposed so as to be opposed to a back surface 13 of the first film 12 which is opposite to the striking surface 11.

The first film 12 and the second film 14 are processed so as to have a bowl shape in which outer edge portions of the first film 12 and the second film 14 are bent. The outer edge portions of the first film 12 and the second film 14 are bent such that the striking surface 11 serves as an outer surface of the bowl, and a surface of the second film 14 which is opposite to a surface thereof which is opposed to the first film 12 serves as an inner surface of the bowl. For example, it is possible to form the first film 12 and the second film 14 having the bowl shape by performing thermal pressing of the first film 12 and the second film 14 in a state in which the flat first film 12 and the flat second film 14 overlap each other.

The sensor 30 is shaped like a film having a thickness of about 50 to 100 μm. The sensor 30 is disposed between the first film 12 and the second film 14. For example, after thermal pressing of the first film 12 and the second film 14, the first film 12 and the second film 14 are separated from each other, and the first film 12 and the second film 14 are arranged one on another again after the sensor 30 is inserted between the first film 12 and the second film 14.

Outer edges of the first film 12 and the second film 14 are inserted into the flesh hoop 20. The first film 12 and the second film 14 are connected to each other in the flesh hoop 20 with, e.g., adhesive. The first film 12 and the second film 14 are held in contact with or close to each other but are not secured to each other inside their respective portions connected to the flesh hoop 20. That is, as illustrated in FIG. 3, the back surface 13 of the first film 12 is held in contact with or close to but is not secured to a first contact surface 31 that is an upper surface of the sensor 30 and opposed to the back surface 13. Likewise, an upper surface 15 of the second film 14 is held in contact with or close to but is not secured to a second contact surface 32 that is a lower surface of the sensor 30 and opposed to the upper surface 15.

In FIGS. 1 and 3, a region A1 is a flat region that serves as a bottom of the bowl as the head portion 10 (i.e., the first film 12 and the second film 14). A region A3 is a region that serves as a side wall of the bowl as the head portion 10. A portion of the head portion 10 which is located at the region A3 is inclined with respect to a portion of the head portion 10 which is located at the region A1. A region A2 is a region on the head portion 10 which is located between the region A1 and the region A3. A portion of the head portion 10 which is located at the region A2 is gradually bent from the region A1 toward the region A3. A region A4 is a region that extends from a boundary between the first film 12 and the flesh hoop 20, to an outer circumferential surface of the flesh hoop 20.

The sensor 30 is disposed at the flat region A1 that serves as the bottom of the bowl as the head portion 10. The sensor 30 is not secured to the first film 12 and the second film 14. That is, the region A1 is a non-secured region at which the first contact surface 31 of the sensor 30 is not secured to the back surface 13 of the first film 12, the second contact surface 32 of the sensor 30 is not secured to the upper surface 15 of the second film 14, and the back surface 13 of the first film 12 and the upper surface 15 of the second film 14 are not secured to each other.

The sensor tail 40 is drawn from the sensor 30 toward the outer edge of the head portion 10 at a position between the first film 12 and the second film 14. At a portion of the region A3 which is located near the flesh hoop 20, the sensor tail 40 extends through the first film 12 to the outside of the first film 12. The sensor tail 40 is at the region A3 bonded and secured to the second film 14 with an adhesive tape.

Figure 4:
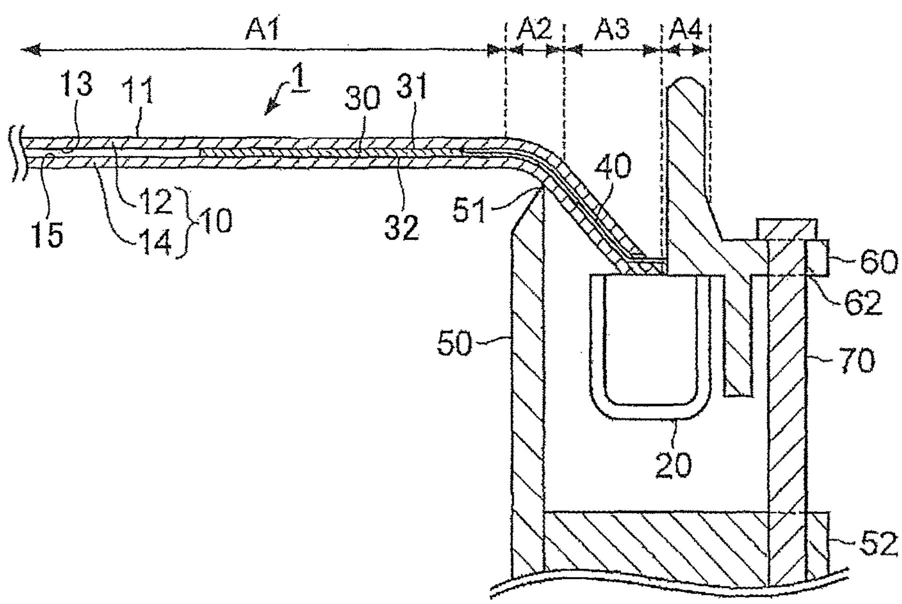
FIG. 4 is a cross-sectional view illustrating a portion of a cross section of a drum including a shell 50 having an open end 51 over which the drum head 1 is stretched.

FIG. 4 is a cross-sectional view illustrating a portion of a cross section of the drum including a shell 50 having an open end 51 over which the drum head 1 is stretched. The drum head 1 is disposed on the open end 51 of the shell 50 in an orientation in which the striking surface 11 faces outward, such that the drum head 1 closes a surface of the shell 50 in which an opening is formed. In the case where the drum head 1 is disposed in this arrangement, the open end 51 of the shell 50 is in contact with the second film 14 at the region A2. A ring-shaped hoop 60 is disposed on the flesh hoop 20 of the drum head 1 disposed on the open end 51. A portion of the hoop 60 which is located at the region A4 is in contact with the flesh hoop 20. The hoop 60 protrudes outward from the outer circumferential surface of the flesh hoop 20. A through hole 62 is formed in a portion of the hoop 60 which protrudes outward. A rod-like tuning pin 70 is inserted in the through hole 62. One end portion of the tuning pin 70 is wider than an opening of the through hole 62 and is in contact with an upper surface of the hoop 60. Thread ridges are formed on a side surface of the other end portion of the tuning pin 70 and engaged with thread grooves formed in a lug 52 secured to an outer circumferential surface of the shell 50.

When the tuning pin 70 is rotated in a direction in which a right-hand screw moves, the tuning pin 70 depresses the hoop 60 and the flesh hoop 20. When the flesh hoop 20 is depressed, the first film 12 and the second film 14 receive a force in a direction directed from the center to the outer edges of the first film 12 and the second film 14. As a result, the first film 12 and the second film 14 are stretched over the open end 51 of the shell 50 under a tension related to an amount of rotation of the tuning pin 70.

When the first film 12 and the second film 14 are stretched over the open end 51 of the shell 50, the sensor 30 is bound by being pressurized by the first film 12 and the second film 14 from opposite sides of the sensor 30, so that the sensor 30 is in close contact with the first film 12 and the second film 14. In this state, the back surface 13 of the first film 12 is held in contact with but is not secured to the first contact surface 31 of the sensor 30, and the upper surface 15 of the second film 14 is held in contact with but is not secured to the second contact surface 32 of the sensor 30.

When the striking surface 11 of the first film 12 stretched over the open end 51 of the shell 50 is played (specifically, struck), the first film 12 and the second film 14 are vibrated together. The sensor 30 detects vibration of the first film 12 and the second film 14 (i.e., vibration of the drum head 1) which is caused by the playing operation (specifically, striking) performed on the striking surface 11. The sensor 30 then outputs a signal related to the vibration. More specifically, the sensor 30 is a strain sensor configured to detect strain on the sensor 30 to detect vibration of the first film 12 and the second film 14. Specifically, the sensor 30 is a film-type piezoelectric sensor including a piezoelectric element formed of a piezoelectric PVDF (polyvinylidene difluoride).

The sensor 30 is disposed such that a strain detecting direction coincides with the radial direction of the first film 12 and the second film 14 (in other words, the radial direction of the shell 50). This arrangement of the sensor 30 enables sensitive detection of vibration of the first film 12 and the second film 14, especially, vibration representing a fundamental tone and vibration representing an overtone.

When stretched over the open end 51 of the shell 50, the sensor 30 is bound by the pressure caused by the first film 12 and the second film 14. Thus, the sensor 30 is expanded and contracted in the strain detecting direction with the first film 12 and the second film 14 being vibrated. Since the sensor 30 is not bonded to the first film 12 and the second film 14, the sensor 30 can be expanded and contracted with slight sliding on the first film 12 and the second film 14. This configuration enables the sensor 30 to detect vibration of the first film 12 and the second film 14 without interfering with vibration of the first film 12 and the second film 14.

The dimension of the sensor 30 in the radial direction of the first film 12 is less than the diameter of the open end 51 of the shell 50, and the area of a film surface of the sensor 30 is small when compared with the area of the surface of the shell 50 in which the opening is formed. Specifically, in the case of the drum head 1 to be stretched over the shell 50 with the open end 51 having the diameter of 12 inches (about 300 mm), the sensor 30 has a size of about 20 mm by 20 mm. Thus, the sensor 30 has such a size that enables the sensor 30 to detect vibration of the drum head 1 at audible frequencies.

In the drum head 1 according to the present embodiment, as described above, the sensor 30 configured to output the signal related to the vibration is disposed between the first film 12 and the second film 14, and the drum head 1 has the non-secured region (specifically, the region A1), at which the sensor 30 is not bonded to the first film 12 and the second film 14, in a region that is located inside the shell 50 when the first film 12 and the second film 14 are stretched over the open end 51 of the shell 50. That is, in the drum head 1, the sensor configured to output a signal related to vibration of the drum head 1 is disposed between the first film 12 and the second film 14 without being bonded to the first film 12 and the second film 14. With this configuration, the sensor 30 of the drum head 1 detects vibration of the drum head 1 stretched over the drum, without interfering with the vibration of the drum head 1. Since the vibration of the drum head 1 is not interfered, the vibration of the drum head 1 which is detected by the sensor 30 is vibration that produces native sound to be produced by the drum. Thus, the drum head 1 can output a signal representing the native sound to be produced by the drum. Accordingly, it is possible to produce the native sound to be produced by the drum, by converting the signal output from the drum head 1, to sound. The user can use the drum using the drum head 1, like what is called an electric acoustic musical instrument.

In the drum head 1, vibration of the first film 12 and the second film 14 is not damped excessively. This configuration enables the sensor 30 of the drum head 1 to detect vibration of the first film and the second film without changing a state of the vibration of the first film and the second film from a state of vibration in a common drum head which is not provided with the sensor 30. This configuration enables the drum head 1 according to the present embodiment to obtain an output signal representing sound having a tone color similar to that of sound produced by the common drum.

The sensor 30 of the drum head 1 is bound by pressure that is applied by the first film 12 and the second film 14 when the first film 12 and the second film 14 are stretched over the open end 51 of the shell 50. This configuration enables the drum head 1 to detect vibration of the first film 12 and the second film 14 without the sensor 30 being bonded to the first film and the second film.

In the drum head disclosed in Patent Document 1, the timing of a strike is detected using a force sensing register. This configuration requires a force sensing register to be disposed throughout a strikable playing zone. In the drum head 1 according to the present embodiment, in contrast, there is no need to dispose the sensor 30 throughout the playing zone. This is because vibration of the first film 12 and the second film 14 which is caused by a strike propagates from a position of the strike toward its surroundings, and the sensor 30 of the drum head 1 detects the propagated vibration to detect the vibration of the first film 12 and the second film 14 which is caused by the strike. In the drum head 1, since there is no need to dispose the sensor 30 throughout the playing zone, it is possible to make the size of the sensor 30 small enough when compared with the diameter of the open end 51 of the shell 50.

In the case where the size of the sensor 30 is substantially equal to the diameter of the open end 51 of the shell 50, the sensor 30 may unfortunately detect both of positive amplitude and negative amplitude in a particular vibrating mode of the head portion 10. In this case, the sensor 30 outputs a signal in which positive amplitude and negative amplitude are canceled out, which may lead to a difference between a tone color of sound converted from the output signal and a tone color of sound produced by the common drum. In the drum head 1 according to the present embodiment, since the size of the sensor 30 is small enough when compared with the diameter of the open end 51 of the shell 50, there is a low possibility that both of positive amplitude and negative amplitude are detected in the particular vibrating mode. Also in this respect, the drum head 1 according to the present embodiment can obtain the output signal representing sound having the tone color similar to that of the sound produced by the common drum.

The user normally performs playing by striking a portion of the striking surface 11 which is located near the center of the head portion 10. This leads to a high possibility of plastic deformation of a central portion of the head portion 10 due to repetition of strikes. In the drum head 1 according to the present embodiment, the sensor 30 is not disposed at the central portion of the head portion 10 which is highly possibly deformed, and the sensor 30 is disposed at an outer edge portion of the head portion 10 which is less likely to be struck directly by the user (more accurately, a portion of the head portion 10 which is located near an inner circumferential surface of the shell 50). With this configuration, in the drum head 1, there is a low possibility that the sensor 30 is damaged by a strike, or the sensor 30 cannot accurately detect vibration of the head portion 10 due to plastic deformation of a portion of the first film 12 which is located just above the sensor 30.

In the case where the sensor 30 is disposed at the central portion of the head portion 10, there is a possibility that an output signal representing a natural attack sound cannot be obtained. Also, in the case where the sensor 30 is disposed at the central portion of the head portion 10, a signal representing sound with an emphasized fundamental tone and a small amount of overtone at sustain (what is called muffled sound) is output. In the drum head 1, in contrast, the sensor 30 is disposed near the outer edge of the head portion 10, making it possible to obtain the output signal representing the natural attack sound. The drum head 1 outputs a signal representing sound having a good balance between an overtone and a fundamental tone at sustain.

In the drum head 1, since the sensor tail 40 is secured to the second film 14, the position of the sensor 30 does not deviate considerably even in the case where the drum head 1 is not stretched over the open end 51 of the shell 50. Also, the sensor tail 40 is secured in the region A3 located outside the shell 50, the securing of the sensor tail 40 does not interfere with vibration of the head portion 10.

One example of a method of obtaining a signal representing drum sound is a method of using a microphone to collect sound produced by vibration of the drum head. A signal output from the microphone in this method contains: a component representing a radiation characteristic of sound radiated from the drum head; and a component representing a sound field characteristic around the drum head. In the drum head 1 according to the present embodiment, in contrast, since vibration of the head portion 10 is directly detected, the signal output from the sensor 30 does not contain the component representing the radiation characteristic and the component representing the sound field characteristic. This signal output from the sensor 30 facilitates various kinds of signal processing such as processing for applying effects in an output stage of the sensor 30. Accordingly, in the drum head 1, when compared with the configuration using the microphone, various kinds of signal processing may be applied to the output signal to obtain drum sound with rich colors.

Second Embodiment

Figure 5:
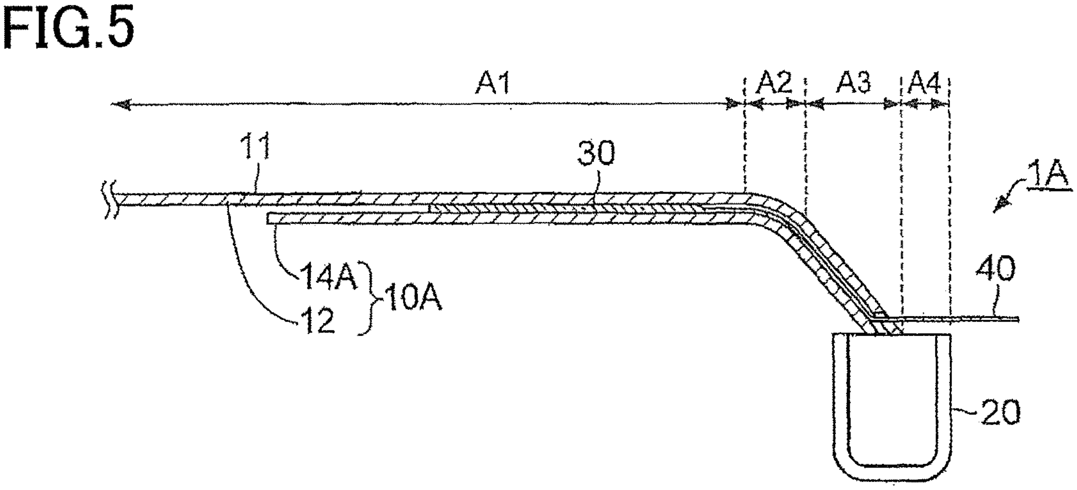
FIG. 5 is a cross-sectional view illustrating a portion of a cross section of a drum head 1A according to a second embodiment of the present invention.

FIG. 5 is a cross-sectional view illustrating a configuration of a drum head 1A according to a second embodiment of the present invention. The drum head 1A according to the present embodiment is different from the drum head 1 according to the first embodiment in that the drum head 1A has a head portion 10A instead of the head portion 10. The head portion 10A is different from the head portion 10 in that the head portion 10A has a second film 14A instead of the second film 14.

In the present embodiment, the second film 14A is a ring-shaped film called what is called a ring mute. Since the second film 14A is shaped like a ring, the center of the head portion 10A does not have a two-layer structure. An outer edge portion of the head portion 10A however has a structure similar to that of the head portion 10. More specifically, a portion of the head portion 10A which is located near the outer edge in the flat region A1 as the bottom of the bowl has a two-layer structure which is constituted by the first film 12 and the second film 14A and in which the sensor 30 is disposed between the first film 12 and the second film 14A.

In the drum head 1A, as in the drum head 1, when the striking surface 11 of the first film 12 is struck, the first film 12 and the second film 14A are vibrated together. The first film 12 and the second film 14A of the drum head 1A vibrate so as to produce drum sound with short sustain when compared with the drum head 1. The sensor 30 of the drum head 1A detects vibration of the first film 12 and the second film 14A which is related to a strike on the striking surface 11, and the sensor 30 then outputs the signal related to the vibration.

The effects obtained in the first embodiment can be obtained also in the present embodiment.

Other Embodiments

While the first and second embodiments of the present invention have been described above, other embodiments of the present invention may be considered. For example, following embodiments may be achieved.

Figure 6:
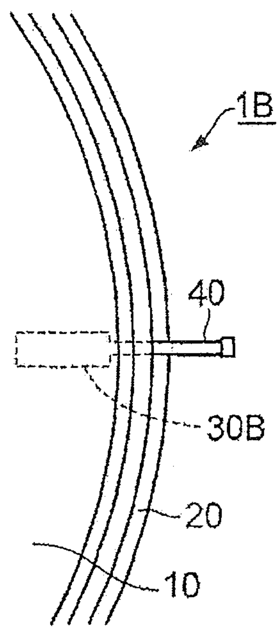
FIGS. 6(A) and 6(B) are plan views respectively illustrating configurations of drum heads 1B, 1C according to a modification (1) of the present invention.
Figure 6:
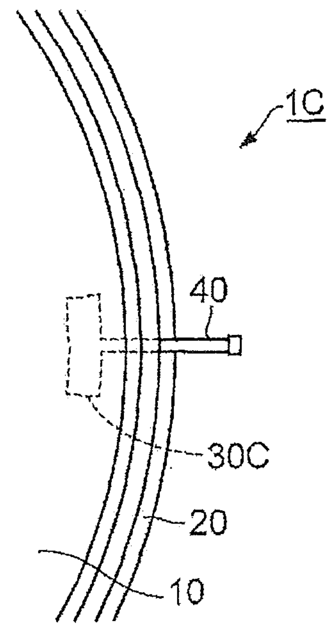

(1) In the first embodiment, the sensor 30 shaped like a film has a square shape. However, the shape of the sensor 30 is not limited to a square. FIG. 6(A) is a plan view illustrating a portion of a configuration of a drum head 1B as one example of this modification. FIG. 6(B) is a plan view illustrating a portion of a configuration of a drum head 1C as another example of this modification.

The drum head 1B illustrated in FIG. 6(A) is different from the drum head 1 according to the first embodiment in that the drum head 1B includes a sensor 30B instead of the sensor 30. The sensor 30B is different from the sensor 30 in that the sensor 30B has a rectangular shape elongated in the radial direction of the head portion 10. The sensor 30B is longer in the radial direction than in the circumferential direction of the head portion 10, enabling sensitive detection of vibration representing a fundamental tone and an overtone of the head portion 10. Thus, the sensor 30B outputs a signal representing bright sound when compared with the drum head 1.

The drum head 1C illustrated in FIG. 6(B) is different from the drum head 1 according to the first embodiment in that the drum head 1C includes a sensor 30C instead of the sensor 30. The sensor 30C is different from the sensor 30 in that the sensor 30C has a shape elongated in the circumferential direction than in the radial direction of the head portion 10. Since the sensor 30C is longer in the circumferential direction than in the radial direction of the head portion 10, it is possible to detect the vibration representing the fundamental tone, but it is difficult to detect the vibration representing the overtone. Positive amplitude and negative amplitude in a vibrating mode representing an overtone appear repeatedly along the circumferential direction of the head portion 10. The sensor 30C more easily detects both of positive amplitude and negative amplitude in a particular vibrating mode. Thus, the sensor 30C outputs a signal in which positive amplitude and negative amplitude are canceled out in a vibrating mode representing a particular overtone. Accordingly, the sensor 30C outputs a signal representing thick muffled sound when compared with the drum head 1.

As in the drum heads 1B, 1C, it is possible to change the tone color of the drum sound by changing the shape of the sensor.

Figure 7:
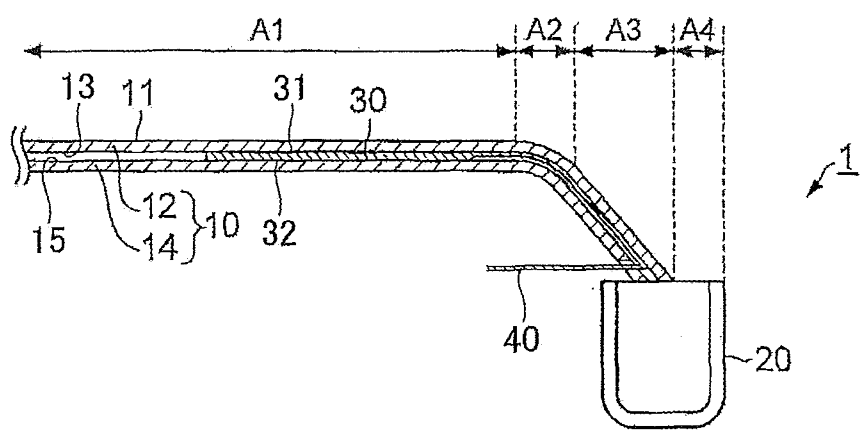
FIG. 7 is a cross-sectional view illustrating a portion of a cross section of the drum head 1 according to a modification (2) of the present invention.

(2) In the drum head 1 according to the first embodiment, the sensor tail 40 is secured to the second film 14 with the adhesive tape in the region A3. However, the method of securing the sensor tail 40 is not limited to the method using the adhesive tape. The sensor tail 40 may be secured to the first film 12 in the region A3. As illustrated in FIG. 7, the sensor tail 40 may extend from a portion of the region A3 which is located near the flesh hoop 20, so as to extend through the second film 14 to the inside of the second film 14. The sensor tail 40 may be secured to both of the first film 12 and the second film 14 in the region A3. The sensor tail 40 may not be secured to the first film 12 and the second film 14.

EXPLANATION OF REFERENCE NUMERALS

1, 1A, 1B, 1C: Drum Head, 10, 10A: Head Portion, 11: Striking Surface, 12: First Film, 14, 14A: Second Film, 20: Flesh Hoop, 30, 30B, 30C: Sensor, 40: Sensor Tail, 50: Shell, 51: Open End, 52: Lug, 60: Hoop, 62: Through Hole, 70: Tuning Pin

The invention claimed is:

1. A drum head comprising:

a first film including a striking surface and a back surface opposite the striking surface;

a second film including a front surface disposed facing the back surface of the first film; and a sensor disposed between the first film and the second film and configured to output a signal related to vibration, and comprising:

- a first contact surface in contact with the back surface of the first film without being secured or bonded to the back surface;
- a second contact surface in contact with the front surface of the second film without being secured or bonded to the front surface; and
- a sensor tail secured to at least one of the first film or the second film located outside a shell when the first film and the second film are stretched over an open end of the shell.

2. The drum head according to claim 1, wherein the sensor tail is secured to the second film located outside the shell and extends through the first film toward an outside of the first film.

3. The drum head according to claim 1, wherein the sensor tail is secured to the first film located outside the shell and extends through the second film toward an outside of the second film.

4. The drum head according to claim 1, wherein the second film is a ring-shaped film.

* * * * *